United States Patent [19]
Holley

[11] Patent Number: 4,792,128
[45] Date of Patent: Dec. 20, 1988

[54] NO GROW GAS SPRING

[75] Inventor: David M. Holley, Whitmore Lake, Mich.

[73] Assignee: Power Components, Inc., Redford, Mich.

[21] Appl. No.: 165,517

[22] Filed: Mar. 8, 1988

[51] Int. Cl.⁴ .............................................. F16F 9/34
[52] U.S. Cl. ...................................... 267/118; 92/23; 267/64.28
[58] Field of Search .......................... 92/15, 20, 23, 24; 188/322.17; 267/64.11, 64.28, 113, 118, 120, 124

[56] References Cited

U.S. PATENT DOCUMENTS 3,575,087  4/1971  Sherwood .............................. 92/23
4,323,224  4/1982  Freitag et al. ................... 267/120 X

FOREIGN PATENT DOCUMENTS 2070192  9/1981  United Kingdom ................ 267/124

Primary Examiner—Duane A. Reger
Attorney, Agent, or Firm—Barnes, Kisselle, Raisch, Choate, Whittemore & Hulbert

[57] ABSTRACT

A gas spring with a piston rod slidably received in a cylinder with a chamber which is charged with a compressed gas. A positive stop is removably received in the cylinder to limit the extent to which the rod can be extended independently of a bearing and seal assembly in the chamber in which the rod is slidably received. An end cap with a filler valve therein is removably received and releasably retained in the cylinder adjacent its other end.

9 Claims, 1 Drawing Sheet

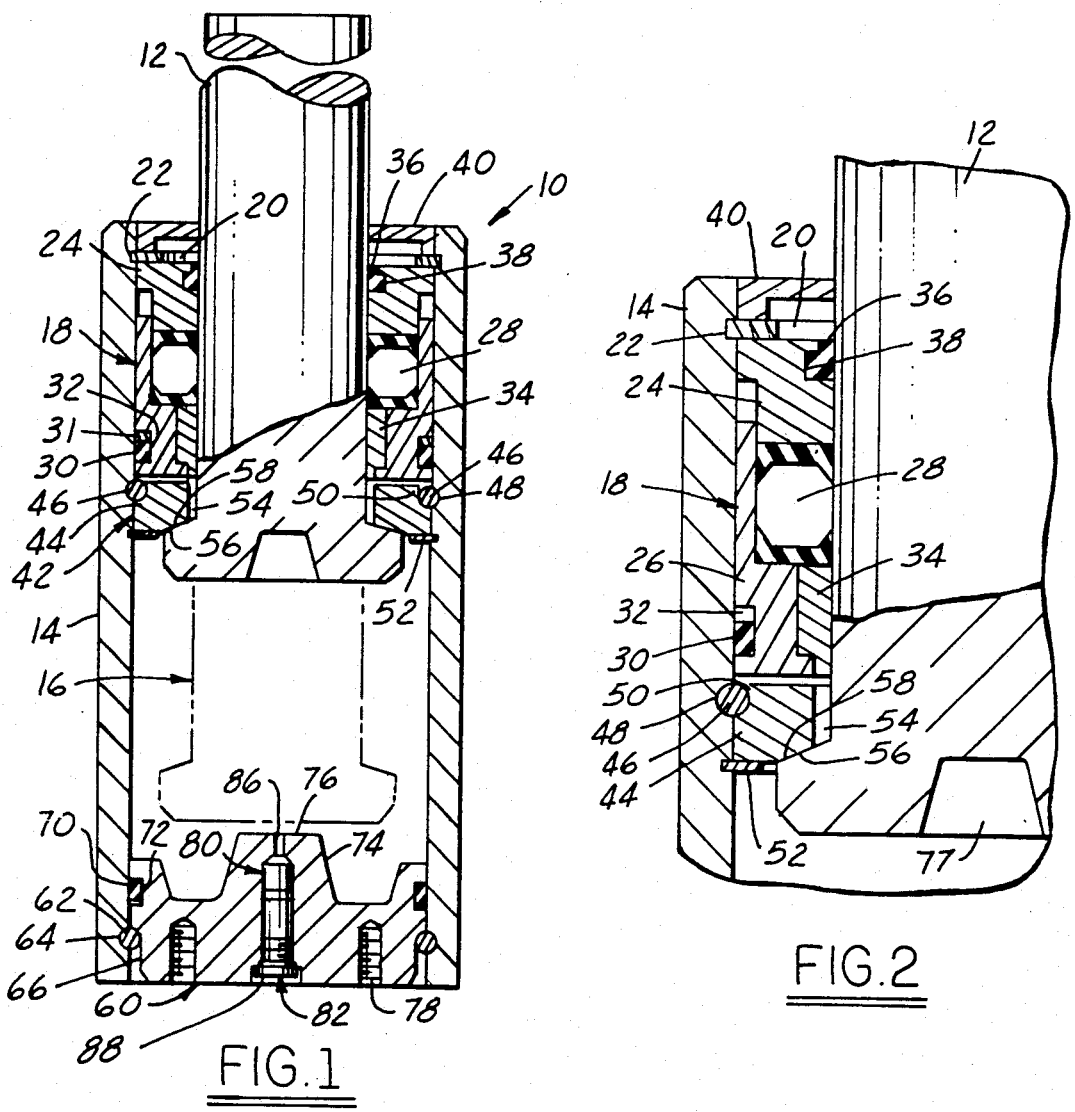
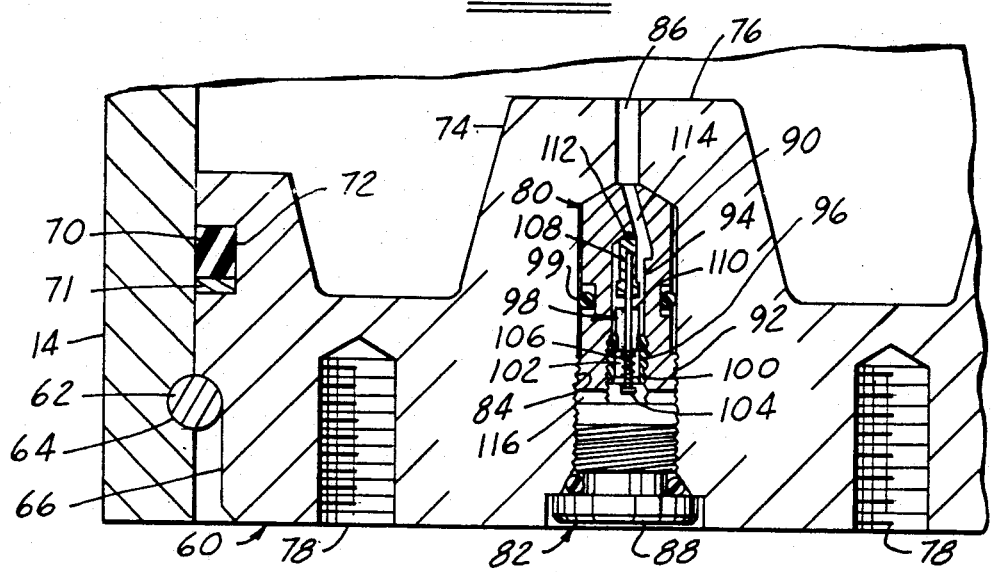

NO GROW GAS SPRING

FIELD OF THE INVENTION

This invention relates to pneumatic devices, and more particularly to a gas spring having a positive piston stop and a removable end cap with a valve assembly received therein.

BACKGROUND

Previously, self-contained gas springs have been constructed with an actuating rod connected to a piston sidably received in a cylinder having a chamber which is precharged at a predetermined pressure, such as 2000 PSI, with an inert gas, such as nitrogen. When the rod and piston are forced into the chamber, the gas therein is compressed to a maximum operating pressure which is usually in the range of about 3,000 to 5,000 PSI, depending on the volume of the chamber and the effective area and stroke of the piston. In normal use, the pressure to which a self-contained gas spring is initially charged is not varied or changed. The spring is initially charged, relieved and recharged through a high pressure valve of the type commonly used in aircraft struts and accumulators.

Previously, gas springs have been constructed with the rod being slidably received in a bearing and retaining assembly received in a tube cylinder. This assembly has a front housing slidably received in a rear housing with a rod gasket or seal therebetween. In use, the gasket is compressed axially so that it expands radially inward into firm sealing engagement with the piston rod by the force produced by pressurized gas in the piston chamber acting on the rear housing. However, in use the rod seal wears away and permits longer strokes of the piston. This results in the piston rod striking the associated dies and causing damage thereto, and/or a rod retainer on the piston head striking the rear housing and causing them to mushroom and/or be damaged. Thus, these self-contained gas springs require considerable maintenance and repair. Moreover, when repair is needed, these gas springs are not easily disassembled, since the bearing assembly, piston rod and retainer must all be removed and replaced through one end of the cylinder housing because a cap is permanently fixed to the other end.

SUMMARY

A gas spring having a positive piston stop removably received in a cylinder housing and releasably retained therein. The positive stop prevents the piston from striking a piston rod bearing and seal assembly received in the cylinder housing. Pressurized gas in the housing causes this assembly to expand the gasket radially inward to provide a seal for the piston rod. To facilitate assembly and disassembly of and provide easy access to the internal components, this seal assembly is removably and releasably retained adjacent one end of the housing and a removable end cap is releasably retained adjacent the other end of the housing. Preferably, the end cap, stop and seal assembly are retained so they cannot be released or removed so long as there is pressurized gas in the housing.

Objects, features and advantages of this invention are to provide a gas spring having a positive stop preventing damage to its component parts and associated dies even though the rod seal wears during use, having an end cap and seal assembly removable from opposite ends of the housing to thereby facilitate assembly, disassembly and repair, a long service life and is rugged, durable, reliable, of relatively simple design and economical manufacture and assembly.

BRIEF DESCRIPTION OF THE DRAWINGS

These and other objects, features and advantages of this invention will be apparent from the following detailed description, appended claims, and accompanying drawing in which:

FIG. 1 is a full sectional view of a gas spring embodying this invention;

FIG. 2 is an enlarged and fragmentary sectional view of the positive stop of the gas spring of FIG. 1; and FIG. 3 is an enlarged and fragmentary sectional view of the removable end cap and valve assembly of the gas spring of FIG. 1.

DETAILED DESCRIPTION

FIG. 1 illustrates a gas spring 10 embodying this invention with a piston rod 12 received in a cylinder housing or tube assembly 14 defining in part a chamber 16. In use, the chamber is charged with gas under pressure to yieldably urge the piston rod to its extended position. This provides a gas spring or cushion permitting the rod to yieldably move toward its retracted position when a force applied externally to the rod exceeds the force produced thereon by the gas in the chamber.

The piston rod is slidably received in a bearing and seal assembly 18 received in the housing and releasably retained therein by a snap ring 20 removably received in a complimentary groove 22 in the tube 14. This assembly has a front housing 24 slidably received in a rear housing 26 with a rod gasket or seal 28 therebetween. In use, the gasket is compressed axially so that it expands radially inward into firm sealing engagement with the piston rod by the force produced by pressurized gas in the chamber acting on the rear face of the rear housing. To provide a seal between the tube 14 and the rear housing 26, an O-ring 30 and a lockup washer 31 are received in a groove 32 in the rear housing.

The rod is slidably received in a bearing 34 carried by the rear housing. Preferably, the front housing 24 also provides a bearing for the rod. Preferably, both the front housing and the bearing are made of a suitable bearing material such as sintered bronze and impregnated with a suitable lubricant. A rod wiper 36 is received in a groove 38 in the front housing and a dust cap 40 overlies the bearing assembly and is received and frictionally retained in the end of the tube.

Positive Stop

A positive stop 42 for the piston rod is provided by a ring 44 in the tube located behind the bearing assembly and restrained from forward movement by two semicircular ring segments 46 of metal received in a groove 48 in the tube and an annular shoulder 50 in the ring. The positive stop is restrained from rearward movement by a snap ring 52 located behind the stop ring and received in a groove in the tube. In assembly the side wall of the shoulder retains the ring segments in the groove. The positive stop also limits rearward movement of the bearing assembly 18.

The positive stop has a central bore 54 through which the rod is received preferably with a clearance between them. Pressurized gas passes through this clearance to act on the bearing and retainer assembly 18 to force the gasket 28 into sealing engagement with the rod. Preferably, the positive stop and the head of the piston contact each other on complimentary conical surfaces 56 and 58.

End Cap

As shown in FIGS. 1 and 3, a generally cylindrical plug or end cap 60 is slidably received in the other end of the tube 14. The cap is releasably retained in the groove by a pair of semi-circular ring segments 62 of metal received in a groove 64 in the tube and bearing on a circumferentially continuous shoulder 66 of the cap. A seal is provided between the end cap and tube by an O-ring 70 with a lockup washer 71 received in a groove 72 in the tube. Preferably, the cap has a raised central portion 74 with a generally flat end face 76 which provides a positive stop limiting the extent to which the piston rod can be forced into the cylinder. The volume of the chamber 16 is increased by a recess 77 in the head of the rod which preferably also provides clearance for the raised central portion 74 of the end cap. Preferably, to facilitate mounting the cylinder on a die bolster plate or the like, the end cap has a pair threaded blind bores therein which open toward the exterior face of the cap.

Valve Assembly

To facilitate charging or filling the cylinder with compressed gas a valve assembly 80 is received in a cavity 82 with a threaded bore 84 in the cap and communicates with the interior of the chamber 16 of the cylinder through a port 86. The other end of the cavity opens to the exterior of the end cap for receiving a complimentary threaded connector (not shown) for coupling the cavity to a source of compressed gas for filling the cylinder. If desired, the valve assembly can be protected by a screw plug 88 threaded into the inlet of the cavity when the coupling is removed.

Preferably, the valve assembly has a carrier body 90 with a portion having threads 92 complimentary to those of the cavity, and a central bore 94 with a threaded portion 96 in which a poppet valve 98 is received. A seal is provided between the carrier body and the valve cavity 82 by an O-ring 99 received in a groove in the body. The poppet valve has a tubular body 100 with a threaded portion and a central passage 102 in which a stem 104 biased by a spring 106 is received and connected to a valve head 108 which normally bears on a seat 110 to close the valve. Preferably, the poppet valve 98 is a filler core valve for airplane struts and accumulators commercially available from Eaton Corporation, Air Controls Div., Route 501 S. Roxboro, N.C. 27537, as Part No. 302-DD. These valves are believed to comply with the International Organization for Standards specification ISO 7442 192(e) Tire Valves.

To prevent damage to the poppet valve, and particularly the stem, preferably the extent to which the stem and head can travel when opening is limited by a positive stop provided by the bottom 112 of the bore 94. The valve bore 94 communicates with the port 86 and hence the chamber 16 through an inclined passage 114 in the carrier body.

To facilitate threading the carrier body into and out of the cavity, it has a cross slot 116 in its exposed end which can receive the blade of a conventional screw driver. To insure that any gas under pressure in the chamber will be bled to the atmosphere before the valve body is completely disengaged and removed from the cavity, preferably the stem 104 projects into the slot so that the valve will be forced open when the blade of a screw driver is inserted in the slot to begin removing the valve body.

Assembly of the Gas Spring

Assembly and disassembly of the component parts of the gas spring is facilitated by the removable end cap because, when removed, access is provided to both ends of the tubular housing. When assembling the components, preferably the positive stop is first installed in the tube. The positive stop ring 44 is installed by sliding it into the tube 14, inserting the two ring segments 46 in the groove 48 of the tube, sliding the ring over the segments so its shoulder 50 bears on them, and then installing the snap ring 52 in the groove 53. So long as the side wall of the shoulder 50 remains over the ring segments 46, they cannot fall out or be removed from the groove in the tube, thereby insuring the stop ring 44 cannot be forced out of the tube.

Preferably, the piston rod 12 is then inserted through the stop ring 44 from the back end of the tube 14 and the seal and bearing assembly 18 is inserted over the piston rod and into the tube through its front end. The seal assembly is releasably retained in the tube by inserting the snap ring 20 in the groove 22 of the tube. The dust cap 40 is inserted over the rod and frictionally received in the front end of the tube.

Preferably, before the end cap is inserted into the tube 14, the valve assembly 80 and O-ring 70 are installed in the end cap. The end cap 60 is installed by inserting it through the back end into the tube sufficiently so that its outer face is inboard or beyond the groove 64. Then the ring segments 62 are inserted in the groove 64 and the cap moved back toward the end of the tube 14 so that its shoulder 66 overlies and bears on the ring segments to retain them in the groove.

When the chamber 16 of the gas spring is at least partially charged with compressed gas, it forces the end cap 60 into firm engagement with the retainer ring segments 62 so that they cannot be removed from the groove 64 and hence the end cap cannot be removed until the gas in the chamber is bled to the atmosphere to reduce the pressure in the chamber to at least substantially atmospheric pressure. Similarly, the compressed gas forces the stop ring 44 into firm engagement with its ring segments 46 so they cannot be removed. Thus, even though all the component parts of the gas spring can be readily inserted and removed to facilitate assembly and disassembly of the gas spring, it is also constructed so that they cannot be removed or become disassembled so long as the gas in the chamber is compressed to any pressure substantially above atmospheric pressure. Hence, this gas spring avoids the potential hazard of its component parts becoming disassembled and being propelled from the housing by compressed gas in the chamber at a substantial superatmospheric pressure.

Use

When the gas spring is in use, the compressed gas in the chamber forces the rear housing 26 of the seal assembly 18 into firm engagement with the seal 28 and compresses it axially to urge it generally radially inward into sealing engagement with the rod 12. The extent to which the rod can be forced into the cylinder is limited by the rear face of its head bearing on the central projection or prominence 74 of the end cap 60. The extent to which the rod can be extended by the compressed gas acting on its piston head is positively limited by the conical surface 58 of the rod head striking or bearing on the stop ring 44. Thus, the extent to which the rod can be extended is unvarying and does not change even though the seal 28 wears so that the rear housing 26 is moved closer to the front housing 24 of the seal assembly by the compressed gas in the chamber 16. Furthermore, since the bearing and seal assembly 18 is not struck by the head of the piston rod, it does not absorb shock of being struck and hence, the useful life of the seal assembly is increased and its rate of wear and frequency of repair or replacement is decreased.

I claim:

1. A gas spring having a rod which can be moved to compress a gas therein comprising; a cylinder tube defining at least in part a gas chamber, a piston rod slidably received in said cylinder tube, movable between extended and retracted positions, and constructed and arranged to compress a gas within said chamber when moving from its extended position toward its retracted position, a stop ring removably received in said tube, encircling said rod, and bearing on said rod when said rod is in its extended position to provide a positive stop limiting the extent to which said rod can be extended by compressed gas in the chamber, a first retainer releasably retaining said stop ring in said tube so that said stop ring cannot be forced out of said tube by said rod bearing thereon when moved to its extended position by compressed gas in the chamber, an end cap removably received in said tube adjacent one end thereof, spaced from said rod when in its extended position and in cooperation with said tube defining at least in part the gas chamber, a second retainer removably received in said tube and releasably retaining said end cap so that it cannot be forced out of said tube by compressed gas in the chamber, and a filler valve received in said end cap, communicating with the chamber and constructed and arranged to be normally closed when the chamber is filled with compressed gas during normal use of the gas spring.

2. The gas spring of claim 1 which also comprises a bearing and seal assembly slidably received over said rod and removably received within said tube between said stop ring and the other end of said tube, said bearing and seal assembly having first and second housings and a seal disposed between them so that as said housings are urged toward each other by compressed gas in the chamber the seal is compressed generally axially and urged generally radially inward into sealing engagement with said rod, and a third retainer removably received in said tube adjacent its other end to prevent compressed gas in the chamber from forcing said bearing and seal assembly out of such other end of said tube.

3. The gas spring of claim 2 which also comprises a dust cap encircling said rod and received in said tube adjacent such other end.

4. The gas spring of claim 2 which also comprises at least one bearing carried by one of said first and second housing and having said rod slidably received therein.

5. The gas spring of claim 3 wherein said third retainer comprises a snap ring removably receivable in a groove in said tube adjacent such other end.

6. The gas spring of claim 1 wherein said first retainer comprises a circumferentially continuous groove in said tube, a circumferentially continuous shoulder on said stop ring, and at least one ring segment received in both said groove and said shoulder.

7. The gas spring of claim 1 wherein said second retainer comprises a circumferentially continuous groove in said tube adjacent its one end, a circumferentially continuous shoulder on said end cap opening toward such one end of said tube, and at least one ring segment received in both said groove and said shoulder.

8. The gas spring of claim 7 which also comprises a circumferentially continuous groove in said end cap opening toward said tube and an O-ring received in said groove to provide a seal between said tube and end cap to prevent compressed gas in the chamber from escaping between them.

9. The gas spring of claim 1 wherein said end cap has an abutment disposed in the chamber and constructed and arranged to provide a positive stop to limit the extent to which said rod can be forced into the chamber.

* * * * *